United States Patent [19]

Nishimura et al.

[11] Patent Number: 4,975,570
[45] Date of Patent: Dec. 4, 1990

[54] ROTARY ENCODER USING MULTIPLE DIFFRACTED BEAMS HAVING CO-INCIDENT PATHS

[75] Inventors: Tetsuharu Nishimura, Kawasaki; Koh Ishizuka, Urawa; Masaaki Tsukiji; Satoshi Ishii, both of Tokyo; Yoichi Kubota, Kawasaki, all of Japan

[73] Assignee: Canon Kabushiki Kaisha, Tokyo, Japan

[21] Appl. No.: 494,860

[22] Filed: Mar. 14, 1990

Related U.S. Application Data

[63] Continuation of Ser. No. 375,871, Jul. 6, 1989, abandoned.

[30] Foreign Application Priority Data

Jul. 19, 1988 [JP] Japan .................................. 63-181152

[51] Int. Cl.⁵ .............................................. G01D 5/34
[52] U.S. Cl. .............................. 250/231.16; 250/237 G
[58] Field of Search ...................... 250/237 G, 231 SE; 356/356, 374; 33/707

[56] References Cited

U.S. PATENT DOCUMENTS

| | | | |
|---|---|---|---|
| 3,756,723 | 9/1973 | Hock | 250/237 G |
| 4,676,645 | 6/1987 | Taniguchi et al. | 356/356 |
| 4,792,678 | 12/1988 | Spies . | |

Primary Examiner—David C. Nelms
Assistant Examiner—Khaled Shami
Attorney, Agent, or Firm—Fitzpatrick, Cella, Harper & Scinto

[57] ABSTRACT

A rotary encoder for detecting a rotation status of a rotary scale having a diffraction grating formed along a rotational direction comprises a directing device for directing a radiation beam to a first position on the rotary scale and directing a plurality of diffracted beams generated at the first position to a second position different from the first position. The direction device is constructed such that the plurality of diffracted beams gave a common light path between the first position and the second position. The encoder also includes a forming device for forming an interference beam from a plurality of rediffracted beams generated at the second position, and a convertor for converting the interference beam to a signal to produce the signal representing the rotation status.

32 Claims, 3 Drawing Sheets

ROTARY ENCODER USING MULTIPLE DIFFRACTED BEAMS HAVING CO-INCIDENT PATHS

This application is a continuation of application Ser. No. 375,871 filed Jul. 6, 1989 now abandoned.

BACKGROUND OF THE INVENTION

1. Field of the Invention

The present invention relates to a rotary encoder, and more particularly to a rotary encoder in which a light beam from a laser is irradiated to a rotary scale (rotational scale) having a radial diffraction grating (amplitude type diffraction grating) having a plurality of grating patterns of light transmission areas and light reflection areas periodically arranged along a circumference. The a rotating angle and a velocity of the rotary scale is photo-electrically detected by utilizing a diffracted light from the diffraction grating.

A rotary encoder which uses a rotary scale having a diffraction grating arranged on a periphery of a disk connected to a rotating member and in which a laser beam is irradiated to the diffraction grating to interfere diffracted lights generated by the diffraction grating, and a rotating angle and a rotating speed of the rotary scale (rotational body) are detected by detecting a change in intensity of the interfered light, has been known in the art.

FIGS. 1A and 1B show a structure of a conventional rotary encoder disclosed in U.S. Pat. No. 4,792,678. Numeral 1 denotes a laser, numeral 2 denotes a disk (rotary scale) having a radial diffraction grating formed thereon, numeral 3 denotes a reflection prism, numeral 4 denotes a polarization prism, numerals 51 and 52 denote photo-sensors, and numeral 6 denotes a rotating shaft of the disk 2. In FIG. 1A, a laser beam emitted from the laser 1 is directed to a point $M_1$ on the diffraction grating of the disk 2 essentially normally. A plurality of ± 1-order diffraction lights generated at the point $M_1$ are reflected orthogonally by a first orthogonal reflection plane 3a of the reflection prism 3, totally reflected twice by each of side planes 3c and 3d of the reflection prism 3, again orthogonally reflected by a second orthogonal reflection plane 3b of the reflection prism 3, and directed to a point $M_2$ on the diffraction grating of the disk 2. FIG. 1B illustrates a light path of the ± 1-order diffraction lights in the reflection prism 3. It is a plan view of the reflection prism 3 shown in FIG. 1A, as viewed from the bottom. As shown in FIG. 1B, the ± 1-order lights generated at the point $M_1$ are directed to different directions from each other at diffraction angles $\alpha+$ and $\alpha-$, and totally reflected by the side planes 3c and 3d of the reflection prism 3. They cross near the center of the reflection prism 3, are again totally reflected by the side planes 3c and 3d, and are directed to the points $M_2$ on the diffraction grating 2 from the different directions at the same angles as the diffraction angles $\alpha+$ and $\alpha-$. Thus, the ± 1-order rediffracted lights at the point $M_2$ exit from the diffraction grating in superposition and parallel to the incident light from the laser 1 at the point $M_1$. The superimposed ± 1order rediffracted lights are received by the photo-sensors 51 and 52 through the polarization prism 4. The phases of the ± 1order diffracted lights change by ± $2\pi$ as the diffraction grating of the disk 2 rotates by one grating pitch. Similarly, the phases of the ± 1order rediffracted lights change by ± $4\pi$ as the diffraction grating rotates by one grating pitch. Thus, when the ± 1-order rediffracted lights are superimposed and interfered with each other as shown in FIGS. 1A and 1B, the photo-sensors 51 and 52 produce four periods of sine wave signals in one grating pitch rotation of the diffraction grating of the disk 2. Thus, the photosensors 51 and 52 produce 4N periods of the sine wave signals in one rotation of the disk 2 where N is the total number of gratings on the diffraction grating. In FIGS. 1A and 1B, the points $M_1$ and $M_2$ are substantially symmetric with respect to the rotation center of the rotating shaft 6 so that a measurement error is prevented even if an eccentricity is involved in the mounting of the disk 2 on the rotating shaft 6. The photo-sensors 51 and 52 produce first and second signals having a 90° phase difference therebetween by the combination of the direction of the linear polarization light of the laser beam emitted from the laser 1, the conversion to the ± 1-order elliptic polarization lights by the total reflection in the reflection prism 3, and the polarization prism 4. Thus, the rotating direction of the disk 2 may be determined by comparing those signals. In the prior art rotary encoder described above, the following problems are encountered.

(1) The light path of the diffracted light is complex and the assembly and adjustment are difficult to attain.

(2) The light path of the interfering ± 1order diffracted lights crosses another light path in the reflection prism 3. As a result, a measurement error may be easily introduced by an environmental change such as surrounding temperature change and temperature distribution. The larger the diameter of the disk 2 is, the longer is the light path of the ± 1-order diffracted lights in the reflection prism 3, that is, non-common light path, and hence the error will more likely be introduced.

(3) Because the reflection prism 3 is on the extension of the rotating shaft 6, it is difficult to adopt a hollow structure which is useful in the rotary encoder.

SUMMARY OF THE INVENTION

It is an object of the present invention to provide a rotary encoder which solves the problems encountered in the prior art, is hard to introduce a measurement error due to the environmental change and permits high precision measurement.

In order to achieve the above object, in the rotary encoder of the present invention, a light beam from a light source is irradiated to a first position on a rotary scale having a diffraction grating formed thereon along a circumference, first and second diffracted lights generated at the first position are directed to a second position which is substantially symmetric with respect to the first position about the rotation center of the rotary scale, interference lights formed by first and second rediffracted lights generated by the diffraction of the first and second diffracted lights at the second position are directed to photo-sensors, and a rotation status of the rotary scale is detected based on the output signals from the photo-sensors. The light paths of the first and second diffracted lights have a substantially common light path between the first and second positions.

In accordance with one embodiment of the present invention, the light beam from the light source is divided into a first light beam for forming the first diffracted light and a second light beam for forming the second diffracted light by first light slit means, the first and second light beams are directed to the first position at predetermined incident angles such that exit angles are substantially equal and the light paths of the first and second diffracted lights are rendered identical, the first and second diffracted lights are directed to the second position along the common light path in the same direction to generate the first and second rediffracted lights, and the first and second rediffracted lights are superimposed by second light split means and directed to the photo-sensing means.

Other features and specific forms of the present invention will be apparent from the following description of the embodiments.

DESCRIPTION OF THE PREFERRED EMBODIMENTS

Figure 2A:
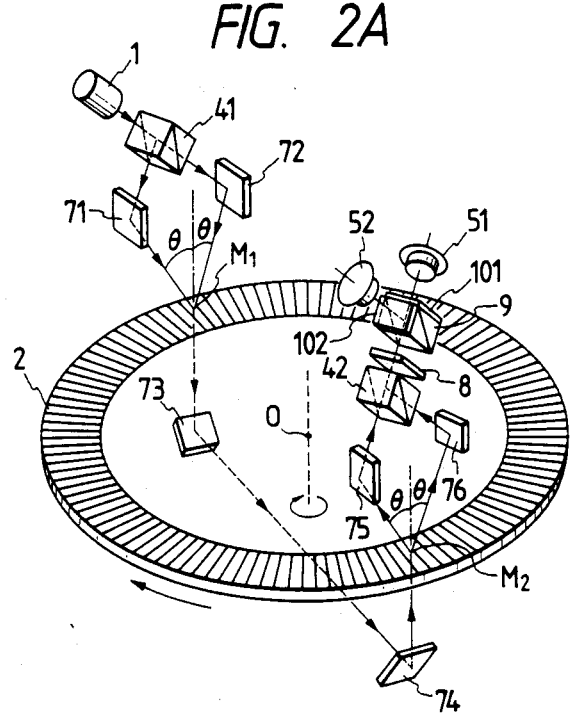
FIGS. 2A and 2B show one embodiment of a rotary encoder of the present invention.
Figure 2B:
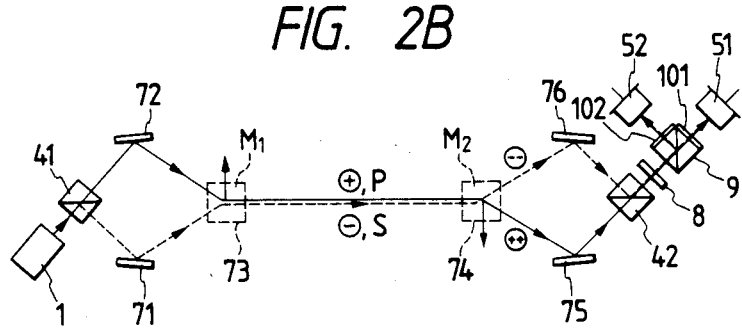

FIG. 2A shows an optical system in one embodiment of the present invention, and FIG. 2B shows a light path development view in the embodiment of FIG. 2A. In FIG. 2A, numeral 1 denotes a multi-mode semiconductor laser, numeral 2 denotes a rotary scale (rotational scale) having an amplitude type diffraction grating formed thereon along a rotational direction, numerals 41 and 42 denote polarization beam splitters, numerals 51 and 52 denote photo-sensors, numerals 71 and 72 denote reflection mirrors, numeral 8 denotes a ¼ wavelength plate, numeral 9 denotes a beam splitter, and numerals 101 and 102 denote polarization plates having polarization directions to incident light which are shifted by 45° from each other. The direction of the linear polarization of the laser beam emitted from the laser 1 makes an angle of 45° to the polarization direction of the polarization beam splitter 41. Accordingly, the light beam emitted from the laser 1 is split by the polarization beam splitter 41 into a transmission light beam (P-polarization) and a reflection light beam (S-polarization) having an equal intensity. The two split light beams are directed to a position $M_1$ on the diffraction grating of the rotary scale 2 at an angle $\theta$ (diffraction angle) expressed by the following formula $$\theta = \sin^{-1} \lambda/P \qquad ...(1)$$

where $\lambda$ is a center wavelength of the laser beam emitted from the laser 1, and P is a grating pitch at the position $M_1$ of the diffraction grating of the rotary scale 2. An incident plane of the two light beams directed to the position $M_1$ is parallel to the direction of grating array (tangential direction) of the diffraction grating 2 at the position $M_1$.

The two light beams are diffracted by the diffraction grating at the position $M_1$. In the present embodiment, only the +1-order diffracted light generated by the diffraction of one light beam and the −1-order diffracted light generated by the diffraction of the other light beam are utilized.

The ±1-order diffracted lights generated at the position $M_1$ exit from the rotary scale 2 toward the grating plane of the diffraction grating in the normal direction. The ±1order diffracted lights are orthogonally (parallel to the grating plane) reflected by the reflection mirror 73 and directed to the reflection mirror 74 which is located at a position which is substantially symmetric with respect to the reflection mirror 73 about the rotation center axis 0 of the rotary scale 2. The reflection mirror 74 directs the ±1-order diffracted lights to the position $M_2$ on the diffraction grating of the rotary scale 2, normally to the grating plane of the diffraction grating in the same direction. At the position $M_2$, the ±1-order diffracted lights are again diffracted and the ±1-order rediffracted lights which exit at the angle $\theta$ of the formula (1) are formed. The ±1-order rediffracted lights are reflected by the reflection mirrors 75 and 76, respectively, directed to the polarization beam splitter 42 and superimposed therein, pass through the ¼ wavelength plate 8, are split into two light beams by the beam splitter 9 and directed to the photo-sensors 51 and 52 as interference lights through the polarization plates 101 and 102. In this manner, the photo-sensors 51 and 52 produce sine wave signals as a result of the interference of the ±1-order rediffracted lights, through the photoelectric conversion.

Figure 1A:
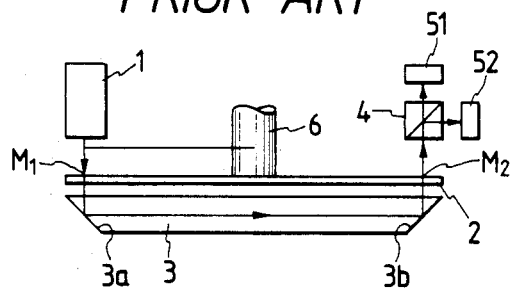
FIGS. 1A and 1B show a prior art rotary encoder.
Figure 1B:
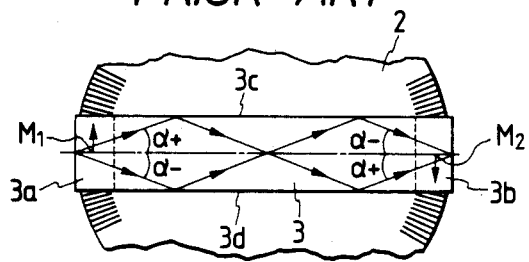

Referring to the light path development view of FIG. 2B, the light paths of the ±1-order diffracted lights are explained. In FIG. 2B, the transmission light (solid line light beam) passed through the polarization beam splitter 41 is directed to the position $M_1$ on the diffraction grating and it is diffracted and exits from the grating plane of the diffraction grating in the normal direction. This is referred to as the ±1-order diffracted light. The reflected light beam (broken line light beam) reflected by the polarization beam splitter 41 is directed to the position $M_1$ and it is diffracted and exits from the grating plane of the diffraction grating 2 in the normal direction. This is referred to as the −1-order diffracted light. The ±1-order diffracted lights generated at the point $M_1$ are superimposed and follow the common light path in the reflection optical system which comprises the reflection mirrors 74 and 75, between the positions $M_1$ and $M_2$. At the position $M_2$, the ±1-order diffracted lights are again generated for the incident ±1-order diffracted lights, but only the light beams shown by the solid line and the broken line are directed to the photosensors 51 and 52 by the function of the polarization beam splitter 42. When the P-polarized +1-order diffracted light (solid line light beam ⊕, P) from the position $M_1$ is directed to the position $M_2$, the ±1-order diffracted lights are generated. Of those, the +1-order diffracted light (solid line light beam + +) is reflected by the reflection mirror 75, passes through the polarization beam splitter 42 and is directed to the photo-sensor. However, the -1-order diffracted light (not shown) is reflected by the reflection mirror 76 and passes through the polarization beam splitter 42 so that it is not directed to the photo-sensor (8, 9, 101, 102, 51, 52). On the other hand, of the ±1-order diffracted lights generated by the direction of the S-polarized −1-order diffracted light (broken line light beam ⊖, S) from the position $M_1$ to the position $M_2$, the −1-order diffracted light (broken line light beam − −) is reflected by the reflection mirror 76, reflected by the polarization beam splitter 42 and directed to the photo-sensor. However, the +1-order diffracted light (not shown) is reflected by the reflection mirror 75 and reflected by the polarization beam splitter 42 so that it is not directed to the photo-sensor. In this manner, the light (solid line light beam) which has been diffracted twice by the +1-order in the rotary scale 2 and the light (broken line light beam) which has been diffracted twice by the −1-order are superimposed in the polarization beam splitter 42, exits therefrom, passes through the ¼ wavelength plate 8, the beam splitter 9 and the polarization plates 101 and 102 to form the interference lights, which are directed to the photosensors 51 and 52. The photo-sensors 51 and 52 produce 4N periods of sine wave signals per one rotation of the rotary scale 2, as they do in the prior art encoder shown in FIGS. 1A and 1B, where N is the total number of gratings. The light beam which has exited from the polarization beam splitter 42 passes through the ¼ wavelength plate 8 and forms the linear polarized light which rotates as the rotary scale 2 rotates. Since the polarization directions of the polarization plates 101 and 102 are shifted by 45° from each other, the photo-sensors 51 and 52 produce the first and second signals having the 90° phase difference therebetween.

The first and second signals may be used to determine the rotating direction of the rotary scale 2. Further, a plurality of signals having different phases may be electrically produced from the first and second signals so that more detailed angle data such as rotating angle which includes sub-divisions of the 4N periods may be prepared from those signals.

In FIGS. 2A and 2B, the light paths of the ±1-order diffracted lights which are generated at the position $M_1$ of the diffraction grating of the rotary scale 2 and reach the position $M_2$ are the common light path. Accordingly, the measurement error is hardly introduced by the environmental change such as surrounding temperature change. Since the ±1-order diffracted lights do not cross as opposed to the prior art encoder shown in FIGS. 1A and 1B, the light paths are not complex and easy to assemble and adjust.

Figure 3:
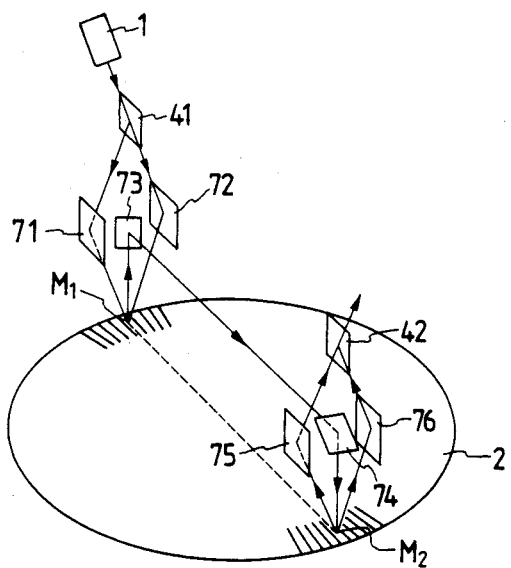
FIGS. 3 and 4 show another embodiment of the rotary encoder of the present invention.

FIG. 3 shows an embodiment of the present invention in which the reflected diffracted light from the diffraction grating is utilized. The like numerals to those shown in FIGS. 2A and 2B denote the like elements. Since the light paths of the ±1-order diffracted lights from the position $M_1$ to the position $M_2$ are one common light path, the reflection type rotary encoder can be readily constructed and a thin rotary encoder is provided.

Figure 4:
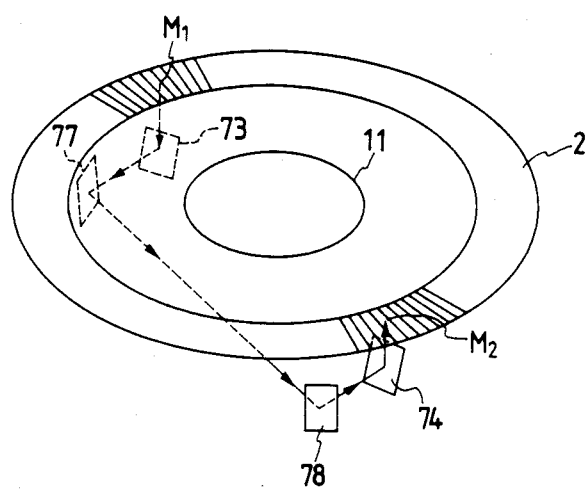

FIG. 4 shows a modification of the embodiment of FIGS. 2A and 2B. The optical system above the rotary scale 2 is identical to that shown in FIG. 2A. The present invention is applied to a hollow rotary encoder. In the present embodiment, since the light paths of the ±1-order diffracted lights from the position $M_1$ to the position $M_2$ a are common light path, the hollow portion 11 of the rotary scale 2 can be readily avoided by the addition of the reflection mirrors 77 and 78.

In the present invention, the rotating shaft can be avoided as shown in FIG. 4. Even if the diameter of the rotary scale 2 is large so that the light paths of the ±1-order diffracted lights from $M_1$ to $M_2$ are long, the measurement error due to the environmental change is hard to be introduced because the light paths of the pair of diffracted lights are common light path.

The diffraction grating of the rotary scale used in the present invention is not limited to the so-called amplitude type diffraction grating but a phase type diffraction grating may be used. The phase type diffraction grating may be a hologram type which permits a fine grating pitch or a relief grating which is easy to manufacture.

In the above embodiments, the 1-order diffracted lights are used for the measurement although any order of diffracted lights may be used. For example, 2-order or 3-order diffracted lights may be used. In this case, the angular resolution of the system is improved.

By applying the technical concept of the present invention to the cylindrical rotary scale shown in the above-mentioned U.S. Pat. No. 4,792,678, the ±1-order diffracted light which exits from the first position on the diffraction grating formed along the periphery of the cylinder may be directed to the opposing second position without any optical system and rediffracted there.

In accordance with the present invention, the light paths for directing the diffracted lights generated at one position on the diffraction grating to the other position which is symmetric about the rotation center of the diffraction grating (the opposite position with respect to the center) are a common light path. Accordingly, the system is easy to assemble and manufacture and the reflection type or hollow type rotary encoder can be readily constructed. Even if the light paths of the pair of diffracted lights are long due to the increase of the diameter of the rotary scale, the measurement error due to the environmental change is not introduced.

What is claimed is:

1. A rotary encoder for detecting a rotation status of a rotary scale having a diffraction grating formed along a rotational direction, comprising:

direction means for directing a radiation beam to a first position on the rotary scale and directing a plurality of diffracted beams generated at the first position to a second position different from the first position;

said direction means being constructed such that the plurality of diffracted beams have a common light path between the first position and the second position;

means for forming an interference beam from a plurality of rediffracted beams generated at the second position; and means for converting the interference beam to a signal to produce the signal representing the rotation status.

2. A rotary encoder according to claim 1, wherein said direction means includes means for supplying a laser beam and an optical system for splitting the laser beam into a plurality of beams and directing the split beams to the first position from different directions, whereby the plurality of beams are diffracted and emitted so as to be superimposed and be in substantially equal direction as the diffracted beams by the diffraction grating and by the action of the optical system.

3. A rotary encoder according to claim 2, wherein said supply means includes a semiconductor laser.

4. A rotary encoder according to claim 2, wherein said direction means further includes a reflection optical system arranged in a light path between the first position and the second position.

5. A rotary encoder according to claim 2, wherein said direction means directs the radiation beam and the diffracted beams such that the first position and the second position are symmetric about the rotation center of the rotary scale.

6. A rotary encoder according to claim 2, wherein said optical system includes a polarization beam splitter for splitting the light beam, a first reflection mirror for directing the beam reflected by said beam splitter to the first position, and a second reflection mirror for directing the beam transmitted through said beam splitter to the first position.

7. A rotary encoder according to claim 6, wherein said direction means further includes a reflection optical system for reflecting the plurality of diffracted beams from the first position and directing the diffracted beams to the second position.

8. A rotary encoder according to claim 7, wherein said means for forming the interference beam includes a polarization beam splitter for interfering the rediffracted beams generated at the second position, a third reflection mirror for reflecting one of the rediffracted beams and directing it to the beam splitter, and a fourth reflection mirror for reflecting the other of the rediffracted beams and directing it to the beam splitter.

9. A rotary encoder according to claim 1, wherein the diffracted beams and the rediffracted beams include ±1-order diffracted beams.

10. A rotary encoder according to claim 1, wherein the diffracted beams and the rediffracted beams include reflected diffracted beams.

11. A rotary encoder according to claim 1, wherein the diffracted beams and the rediffracted beams include transmitted diffracted beams.

12. A method for measuring a displacement of a diffraction grating formed on a rotary scale along a circumference, comprising the steps of:
    directing a radiation beam to a predetermined position on the diffraction grating to generate a plurality of superimposed diffracted beams;
    directing the diffracted beams to another position different from the predetermined position on the diffraction grating to generate a plurality of rediffracted beams; and
    forming an interference beam modulated in accordance with the displacement of the diffraction grating from the rediffracted beams.

13. A method for measuring a displacement of a diffraction grating according to claim 12, wherein said two directing steps are effected such that said two positions are symmetric about the rotation center of the rotary scale.

14. A method for measuring a displacement of a diffraction grating according to claim 13, wherein said rotary scale is of disk shape.

15. A method for measuring a displacement of a diffraction grating according to claim 13, wherein said rotary scale is of cylindrical shape.

16. A rotary encoder for detecting a displacement of a diffraction grating formed on a rotary scale along a circumference, comprising:
    a laser;
    a projection optical system for splitting a laser beam from said laser to first and second beams and directing the first and second beams to a predetermined position on the diffraction grating from different directions;
    a transmission optical system for forming a common light path to a first diffracted beam generated by diffracting the first beam by the diffraction grating and a second diffracted beam generated by diffracting the second beam by the diffraction grating;
    said transmission optical system receiving the first and second diffracted beams from the predetermined position and directing them to a different position from the predetermined position on the diffraction grating;
    reception optical system for receiving a first rediffracted beam generated by rediffracting the first diffracted beam directed to said different position by the diffraction grating and a second rediffracted beam generated by rediffracting the second diffracted beam directed to said different position by the diffraction grating to form an interference beam; and
    photo-electric conversion means for photoelectrically converting the interference beam to produce a signal representing the displacement of the diffraction grating.

17. A rotary encoder according to claim 16, wherein said projection optical system directs the first and second beams to said predetermined position such that the first and second diffracted beams are essentially superimposed and exit from said predetermined position in the same direction.

18. A rotary encoder according to claim 17, wherein said transmission optical system directs the first and second diffracted beams to said different position while they are essentially superimposed.

19. A rotary encoder according to claim 18, wherein said transmission optical system is arranged such that said predetermined position and said different position are symmetric about the rotation center of the rotary scale.

20. A rotary encoder according to claim 19, wherein said first diffracted beam is a .1-order diffracted beam, and said second diffracted beam is a −1-order diffracted beam.

21. A rotary encoder according to claim 20, wherein said first rediffracted beam is a +1-order diffracted beam, and said second rediffracted beam is a −1-order diffracted beam.

22. A rotary encoder according to claim 19, wherein said projection optical system includes a first polarization beam splitter, said first and second beams being formed by said first polarization beam splitter, and said reception optical element includes a second polarization beam splitter, said first and second rediffracted beams being superimposed by said second polarization beam splitter to form the interference beam, and the interference beam is directed to the photo-electric conversion means.

23. A rotary encoder according to claim 22, wherein said first rediffracted beam is a beam having the +1-order diffraction applied twice, said second rediffracted beam is a beam having the −1-order diffraction applied twice, and said receiving optical system is constructed such that one of the first and second rediffracted beams is selectively reflected and the other is selectively transmitted by the second polarization beam splitter.

24. A method for measuring a displacement of a diffraction grating formed on a rotary scale along a circumference, comprising the steps of:
    directing a radiation beam to the diffraction grating so that the radiation beam sequentially passes a first position and a second position different from the first position on the diffraction grating; and
    forming interference beams modulated in accordance with the displacement of the diffraction grating by the first and second diffracted beams generated at the first and second positions;
    said first and second diffracted beams having a common light path between the first position and the second position.

25. A method for measuring a displacement of a diffraction grating according to claim 24, wherein said directing step is effected such that the first position and the second position are essentially symmetric about the rotation center of the rotary scale.

26. A method for measuring a displacement of a diffraction grating according to claim 25, wherein said two steps are effected such that the first diffracted beam is a +1-order diffracted light and the second diffracted beam is a −1-order diffracted light.

27. An apparatus for measuring a displacement of a diffraction grating formed on a rotary scale along a circumference, comprising:
 means for directing a radiation beam to the diffraction grating such that the radiation beam sequentially passes through a first position and a second position different from the first position on the diffraction grating;
 means for forming an interference beam by first and second diffracted beams generated at the first and second positions;
 said first and second diffracted beams having a common light path between the first position and the second position; and
 means for outputting a signal representing the displacement of the diffraction grating in response to the interference beam.

28. An apparatus according to claim 27, wherein said direction means is arranged such that the first and second positions are essentially symmetric about the rotation center of the rotary scale.

29. An apparatus according to claim 28, wherein said direction means and said interference means are arranged such that the first diffracted beam is a +1-order diffracted light and the second diffracted beam is a −1-order diffracted light.

30. An encoder for detecting a displacement status of a scale having a diffraction grating formed along a direction of a displacement, comprising:
 direction means for directing a radiation beam to a first position on the scale and directing a plurality of diffracted beams generated at the first position to a second position different from the first position,
 said direction means being constructed such that the plurality of diffracted beams have a common light path between the first position and the second position;
 means for forming an interference beam from a plurality of rediffracted beams generated at the second position; and
 means for converting the interference beam to a signal to produce the signal representing the displacement status.

31. An encoder for detecting a displacement of a diffraction grating formed on a scale along a direction of a displacement, comprising:
 a laser;
 a projection optical system for splitting a laser beam from said laser to first and second beams and directing the first and second beams to a predetermined position on the diffraction grating from different directions;
 a transmission optical system for forming a common light path to a first diffracted beam generated by diffracting the first beam by the diffraction grating and a second diffracted beam generated by diffracting the second beam by the diffraction grating,
 said transmission optical system receiving the first and second diffracted beams from the predetermined position and directing them to a different position from the predetermined position on the diffraction grating;
 a reception optical system for receiving a first rediffracted beam generated by rediffracting the first diffracted beam directed to said different position by the diffraction grating and a second rediffracted beam generated by rediffracting the second diffracted beam directed to said different position by the diffraction grating to form an interference beam; and
 photo-electric conversion means for photoelectrically converting the interference beam to produce a signal representing the displacement of the diffraction grating.

32. An apparatus for measuring a displacement of a diffraction grating formed on a scale along a direction of a displacement, comprising:
 means for directing a radiation beam to the diffraction grating such that the radiation beam sequentially passes through a first position and a second position different from the first position on the diffraction grating;
 means for forming an interference beam by first and second diffracted beams generated at the first and second positions,
 said first and second diffracted beams having a common light path between the first position and the second position; and
 means for outputting a signal representing the displacement of the diffraction grating in response to the interference beam.

* * * * *

UNITED STATES PATENT AND TRADEMARK OFFICE
CERTIFICATE OF CORRECTION

PATENT NO. : 4,975,570

DATED : December 4, 1990

INVENTOR(S) : Tetsuharu Nishimura, et al.

It is certified that error appears in the above-identified patent and that said Letters Patent is hereby corrected as shown below:

COLUMN 1:

Line 63, "± 1order" should read --± 1-order--.

Line 65, "± 1order" should read --± 1-order--.

Line 67, "± 1order" should read --± 1-order--.

COLUMN 2:

Line 28, "± 1order" should read --± 1-order--.

COLUMN 3:

Line 65, "± 1oerder" should read --± 1-order--.

UNITED STATES PATENT AND TRADEMARK OFFICE
CERTIFICATE OF CORRECTION

PATENT NO. : 4,975,570
DATED : December 4, 1990
INVENTOR(S) : Tetsuharu Nishimura, et al.

It is certified that error appears in the above-identified patent and that said Letters Patent is hereby corrected as shown below:

COLUMN 8:

Line 26, "± 1order" should read --± 1-order--.

Signed and Sealed this

Third Day of November, 1992

Attest:

DOUGLAS B. COMER

Attesting Officer

Acting Commissioner of Patents and Trademarks